(12) United States Patent
Park

(10) Patent No.: US 12,319,348 B2
(45) Date of Patent: Jun. 3, 2025

(54) VEHICLE BODY STRUCTURE

(71) Applicants: Kia Corporation, Seoul (KR);
Hyundai Motor Company, Seoul (KR)

(72) Inventor: Jun Young Park, Gunpo-si (KR)

(73) Assignees: Hyundai Motor Company, South (KR); Kia Corporation, South (KR)

(*) Notice: Subject to any disclaimer, the term of this patent is extended or adjusted under 35 U.S.C. 154(b) by 330 days.

(21) Appl. No.: 18/059,262

(22) Filed: Nov. 28, 2022

(65) Prior Publication Data
US 2023/0219627 A1  Jul. 13, 2023

(30) Foreign Application Priority Data

Jan. 10, 2022  (KR) ................. 10-2022-0003130

(51) Int. Cl.
*B62D 25/04* (2006.01)
*B62D 27/02* (2006.01)

(52) U.S. Cl.
CPC ........... *B62D 25/04* (2013.01); *B62D 27/023* (2013.01)

(58) Field of Classification Search
CPC ...... B62D 25/04; B62D 25/06; B62D 27/023; B62D 23/005

USPC ........ 296/193.06, 23.01, 3, 29, 30, 210, 205
See application file for complete search history.

(56) References Cited

U.S. PATENT DOCUMENTS

2017/0057552 A1   3/2017   Reddy et al.

FOREIGN PATENT DOCUMENTS

| EP | 1024073 B1 | * | 5/2003 | ........... B62D 25/025 |
|---|---|---|---|---|
| FR | 2887185 B1 | | 3/2011 | |
| JP | 5447639 B2 | * | 3/2014 | ............. B21D 53/88 |
| KR | 20110138745 A | * | 12/2011 | |
| KR | 101492008 B1 | | 2/2015 | |

OTHER PUBLICATIONS

EP1024073 Text (Year: 2003).*
JP5447639 Text (Year: 2014).*
KR20110138745 Text (Year: 2011).*

* cited by examiner

*Primary Examiner* — Dennis H Pedder
(74) *Attorney, Agent, or Firm* — Slater Matsil, LLP

(57) ABSTRACT

In an embodiment a vehicle body structure includes a front pillar tube positioned inside of each of a pair of front pillars in a vehicle and a center pillar tube positioned inside of each of pair of center pillars of the vehicle, wherein the front pillar tube and the center pillar tube cross each other.

17 Claims, 4 Drawing Sheets

VEHICLE BODY STRUCTURE

CROSS-REFERENCE TO RELATED APPLICATIONS

This application claims under 35 U.S.C. § 119(a) the benefit of priority to Korean Patent Application No. 10-2022-0003130, filed on Jan. 10, 2022, the entire contents of which are incorporated herein by reference.

TECHNICAL FIELD

The present disclosure relates to a vehicle body structure, and more preferably, to a vehicle body structure that can secure rigidity while expanding a space/field of view by removing a front roof rail from the vehicle body structure and designing a front pillar and a center pillar to cross each other.

BACKGROUND

In general, a body frame has a front pillar forming the front side of a vehicle, a rear pillar forming the rear side of a vehicle, and a center pillar dividing the space between the front pillar and the rear pillar into two spaces, forming a vehicle framework. Such a vehicle body is not only a high-weight part that accounts for about 30% of a vehicle weight, but also has a decisive influence on vehicle performance, such as rigidity, impact resistance, and driving stability.

Meanwhile, a typical vehicle roof rail structure includes a pair of roof sides as a vehicle body or a part thereof, and a plurality of roof rails connecting the pair of roof sides. A center pillar is applied to the roof sides. The center pillar is a metal part or frame that supports the lateral side of a vehicle body and guarantees passenger safety in the event of a collision. In addition, the roof rail is used as a rigid reinforcing material in the vehicle ceiling in case of rollover and collision accidents. The roof rail is also called a roof bow. Currently, such a vehicle roof rail structure is mainly applied to vehicles.

However, as the weight of a vehicle body needs to be reduced due to the increase in the number/weight of batteries and electronic devices of electric vehicles and autonomous vehicles in recent years, and the use of the indoor living space of a vehicle is changed to a lounge type, a change in the vehicle body structure is required. Considering these changes, although the presence of the front roof rail serves to ensure passenger safety in the event of a collision, it cannot meet consumer demand for a wide windshield after the sunroof/vision roof.

In the case of recently designed vehicles, that is, future vehicles, various future-oriented concepts and demands for expansion of a space/field of view are increased. For example, rotating/sliding seats, sliding/slim cockpits, B-pillarless, sliding doors, etc. are required to expand the space, and roof railless, A-pillarless, B-pillarless, hidden wipers, etc. are required as an extension of the field of view.

Accordingly, the roof structure was developed into a sunroof, a panoramic sunroof, a vision roof, and a wide windshield, and the vehicle body structure was developed to a supporter rail deletion, a center rail deletion, and a front/center rail deletion. However, this structure is disadvantageous in vehicle rollover, frontal/side collision, and vehicle torsional rigidity, and has a functional problem in the vehicle body mounting configuration.

SUMMARY

Embodiments provide a vehicle body structure capable of securing rigidity while expanding a space/field of view by removing the front roof rail from the vehicle body structure and designing the front pillar and the center pillar to cross each other.

A vehicle body structure may include the following configuration.

In an embodiment of the present disclosure, there is provided a vehicle body structure including: a front pillar tube positioned inside of each of a pair of front pillars in a vehicle; and a center pillar tube positioned inside of a center pillar of the vehicle, wherein the front pillar tube and the center pillar tube are configured to cross each other.

In addition, the vehicle body structure may further include a roof rail unit extending on a roof on both ends of the front pillar.

In addition, the front pillar tube may be welded to an inner surface of the front pillar on one side, and the center pillar tube may be welded to an inner surface of the center pillar on one side.

In addition, the front pillar tube may extend longer than a longitudinal length of a vehicle windshield.

In addition, the center pillar tube may extend to the roof rail unit.

In addition, the vehicle body structure may further include a bracket formed at a crossing position between the front pillar tube and the center pillar tube, the bracket including: a central portion in contact with the front pillar tube; and a flange portion in contact with the center pillar tube.

In addition, the front pillar tube may be welded and coupled to an inner side of the central portion, and the center pillar tube may be welded and coupled to an inner side of the flange portion.

In addition, the roof rail unit may include: an upper roof rail in contact with an upper surface of the center pillar tube; and a lower roof rail in contact with a lower surface of the center pillar tube and extending to a lower end of the upper roof rail; wherein at least a portion of the windshield overlaps at least a portion of the upper roof rail.

In addition, the center pillar and the roof rail unit may be aligned with each other in a vehicle width direction.

In addition, a cross section of the front pillar tube and a cross section of the center pillar tube may have a trapezoidal shape in which respective sides adjacent to an exterior side of a vehicle are shorter than respective sides adjacent to an interior side of the vehicle.

In addition, the center pillar tube may extend beyond a position of a door striker in a lower direction of the vehicle.

Embodiments of the present disclosure may obtain the following effects by the combination and use relationship between the present embodiments and the configuration described below.

According to the present disclosure, by removing the front roof rail from the vehicle structure and designing the front pillar and the center pillar to cross each other, it is possible to expand a space/field of view of the vehicle body structure, to secure rigidity, and to increase collision stability.

DETAILED DESCRIPTION OF ILLUSTRATIVE EMBODIMENTS

Hereinafter, embodiments of the present disclosure will be described in more detail with reference to the accompanying drawings. Embodiments of the present disclosure may be modified in various forms, and the scope of the present disclosure should not be construed as being limited to the following embodiments. The present embodiments are provided to more completely explain the present disclosure to those of ordinary skill in the art.

In addition, terms such as " . . . part", " . . . unit", etc. described in the specification mean a unit that processes at least one function or operation, which may be implemented by hardware or a combination of hardware.

In addition, in this specification, "height direction", "width direction", and "length direction" are based on a vehicle.

Also, in the present specification, when a first part is "over" or "on" a second part, this includes not only the case where the first part is "directly on" the second part, but also the case where there is a third part between the first part and the second part. In addition, when a first part is "below" or "under" a second part, this includes not only the case where the first part is "directly below" the second part, but also the case where there is a third part between the first part and the second part.

Figure 1:
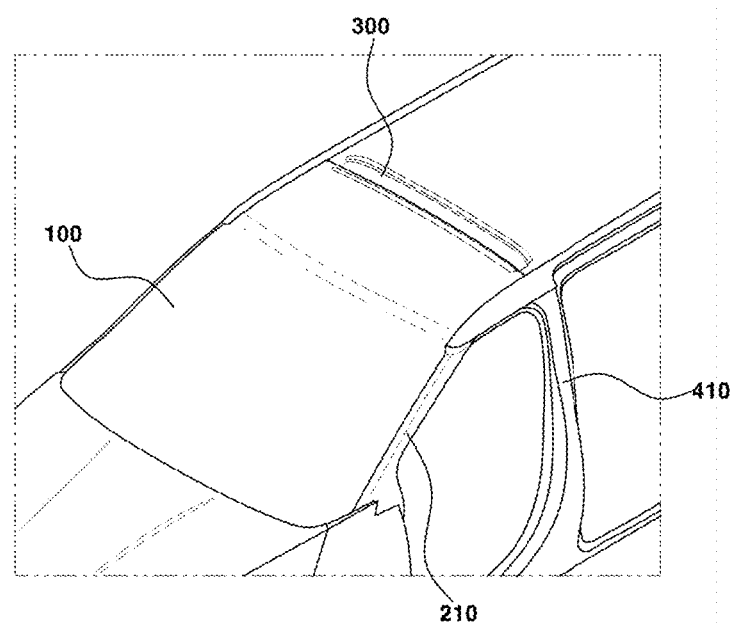
FIG. 1 is a perspective view of a vehicle body structure according to an embodiment of the present disclosure.

FIG. 1 is a perspective view of a vehicle body structure according to an embodiment of the present disclosure.

Referring to FIG. 1, the vehicle body structure according to the embodiment of the present disclosure may be configured to include a pair of front pillars 210, a roof rail unit 300, and a pair of center pillars 410. The pair of front pillars 210 may be located on both sides of a windshield 100 of a vehicle. More preferably, the front pillars 210 may be formed to extend from both sides of the vehicle windshield 100 along the longitudinal direction thereof.

The front pillar 210 may be positioned between the front vehicle body and the roof. More specifically, the front pillars 210 may be formed on both sides of the windshield 100 of a vehicle body. Both ends of the front pillars 210 may be formed adjacent to the loop.

The roof rail unit 300 may be formed to extend over the roof from both ends of the front pillars 210. More preferably, the roof rail unit 300 may extend over the roof from both ends of the front pillars 210 in a width direction of a vehicle.

The pair of center pillars 410 may be formed to extend to the roof rail unit 300. More preferably, the center pillar 410 may be formed to extend in a height direction from a vehicle side sill to the roof rail unit 300. The center pillar 410 may be a pillar that supports the roof between the first and second rows of vehicle seats. According to an embodiment of the present disclosure, the center pillars 410 and the roof rail unit 300 may be configured to be aligned with each other in the vehicle width direction.

The vehicle body structure according to the embodiment of the present disclosure may be configured so that there is no front roof rail structure. In other words, the windshield 100 may be formed to extend from a vehicle cowl to the roof rail unit 300 in the vehicle longitudinal direction. To this end, the front pillars 210 and the center pillar 410 may be configured to cross each other. More preferably, one end of the front pillar 210 and one end of the center pillar 410 may be configured to vertically cross each other. The front pillar 210, the roof rail unit 300, and the center pillar 410 may be configured to be connected at a mutual cross point that is a corner of the windshield 100.

Figure 2:
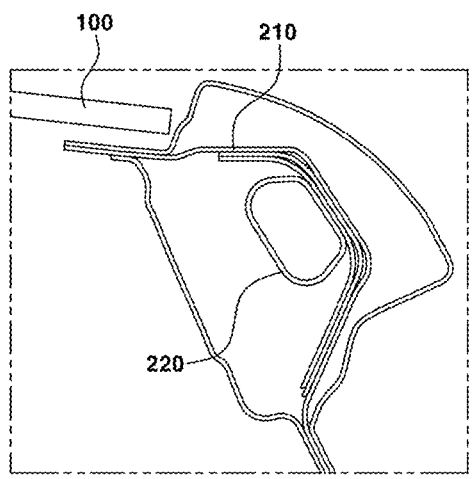
FIG. 2 illustrates a front pillar of the vehicle body structure according to an embodiment of the present disclosure.
Figure 3:
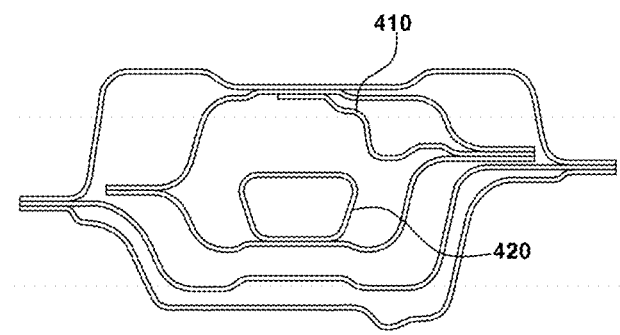
FIG. 3 illustrates a center pillar of the vehicle body structure according to an embodiment of the present disclosure.

FIG. 2 illustrates a front pillar 210 of the vehicle body structure according to an embodiment of the present disclosure, and FIG. 3 illustrates a center pillar 410 of the vehicle body structure according to an embodiment of the present disclosure.

Referring to FIGS. 2 and 3, the vehicle body structure according to the embodiment of the present disclosure includes a front pillar tube positioned inside of the front pillar of a vehicle, and a center pillar tube positioned inside of the center pillar of a vehicle, wherein the front pillar tube and the center pillar tube may be configured to cross each other. The front pillar 210 may have an internal space into which the front pillar tube 220 may be inserted.

The front pillar tube 220 may be located inside of the front pillar 210. More preferably, the front pillar tube 220 may be welded to an inner surface of the front pillar 210 on one side. In an embodiment, the front pillar tube 220 may be welded to the inner surface of the front pillar 210 on the external side.

The front pillar tube 220 may be configured in a tubular shape having a trapezoidal cross section. In an embodiment, the front pillar tube 220 may be configured such that a cross-section of a short side of the trapezoidal cross-section thereof is welded to the inner surface of the front pillar 210. The front pillar tubes 220 may be welded to the front pillar 210 at predetermined intervals along the longitudinal direction of the front pillar tube 220.

The center pillar 410 may have an internal space into which the center pillar tube 420 may be inserted. The center pillar tube 420 may extend beyond the position of a door striker 421 in the lower direction of a vehicle.

The center pillar tube 420 may be located inside of the center pillar 410. More preferably, the center pillar tube 420 may be welded to an inner surface of the center pillar 410 on one side. In an embodiment, the center pillar tube 420 may be welded to the inner surface of the center pillar 410 on the exterior side.

The center pillar tube 420 may be configured in a tubular shape having a trapezoidal cross section. In an embodiment, the center pillar tube 420 may be configured such that a cross-section of a short side of the trapezoidal cross-section thereof is welded to the inner surface of the center pillar 410. The center pillar tubes 420 may be welded to the center pillar 410 at predetermined intervals along the longitudinal direction of the center pillar tube 420.

According to an embodiment of the present disclosure, the cross-section of the front pillar tube 220 and the cross-section of the center pillar tube 420 may be configured such that respective sides adjacent to the exterior side of a vehicle are shorter than respective sides adjacent to the interior side of a vehicle, thereby forming a trapezoidal shape.

Figure 4:
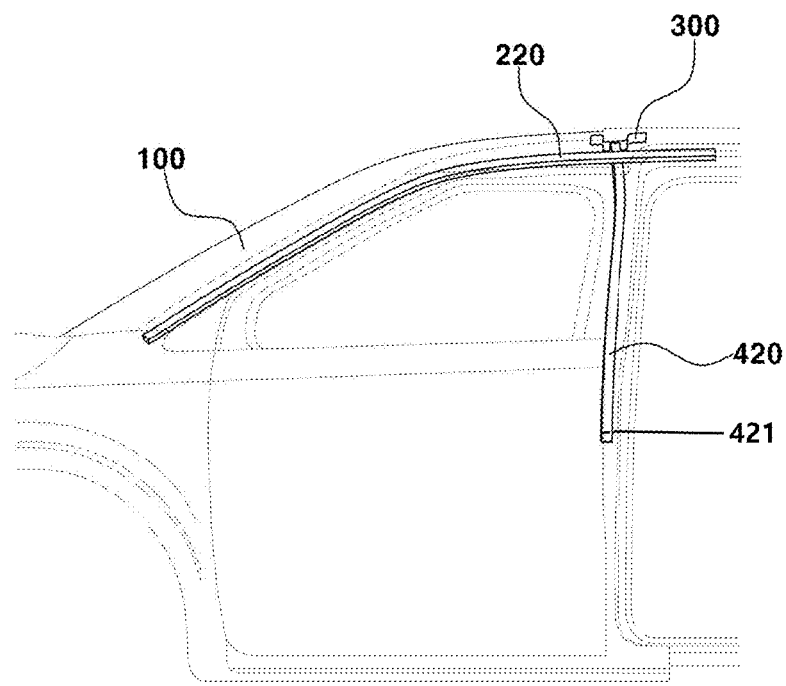
FIG. 4 is a side view of the vehicle body structure according to the embodiment of the present disclosure.

FIG. 4 is a side view of the vehicle body structure according to the embodiment of the present disclosure.

Referring to FIG. 4, in the vehicle body structure according to the embodiment of the present disclosure, the front pillar tube 220 may be configured to extend longer than the length in the longitudinal direction of the windshield 100. More preferably, the front pillar tube 220 may extend from one end to another end of the windshield 100. Further, the front pillar tube 220 may extend longer than another end of the windshield 100. Alternatively, the front pillar tube 220 may extend at least the same length in the longitudinal direction of the windshield 100.

Meanwhile, the center pillar tube 420 may be configured to extend to the roof rail unit 300. In an embodiment, the center pillar tube 420 may be formed to extend from a position of a striker 421 of a front door to the roof rail unit 300 in the height direction. In another embodiment, the center pillar tube 420 may be formed to extend to correspond to the length of the center pillar 410.

Figure 5:
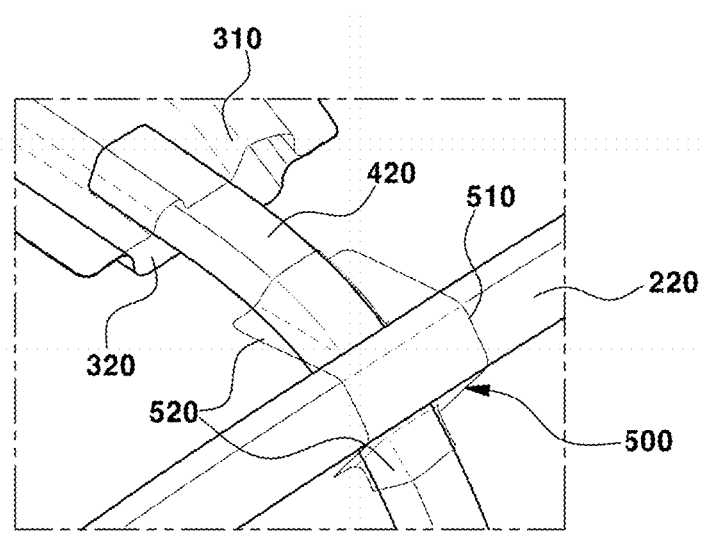
FIG. 5 illustrates a bracket of the vehicle body structure according to an embodiment of the present disclosure.
Figure 6:
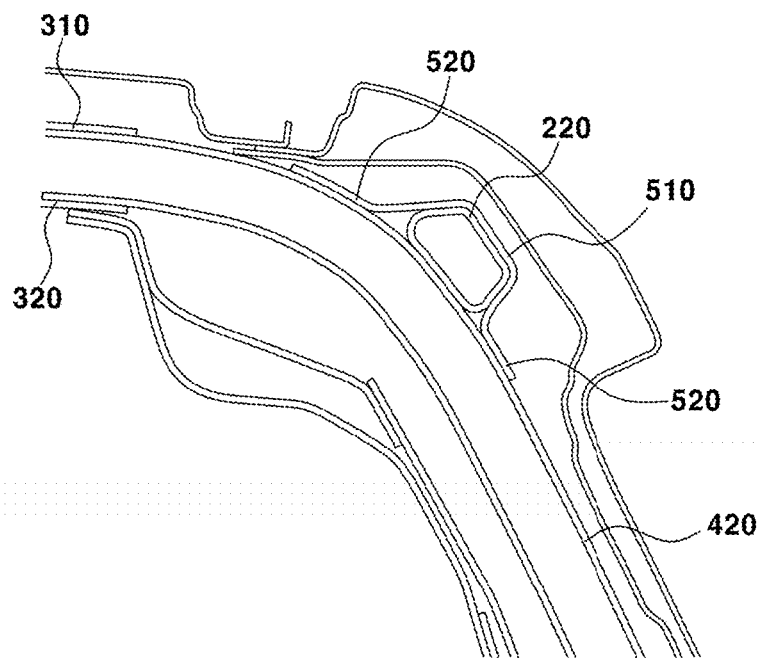
FIG. 6 is a cross-sectional view illustrating the vehicle body structure according to the embodiment of the present disclosure.
Figure 7:
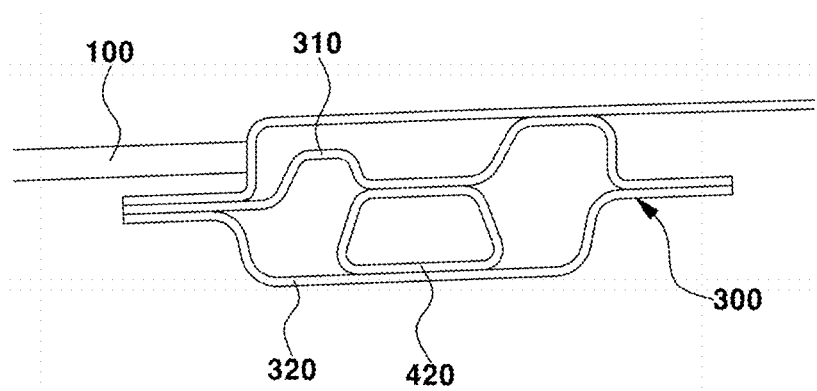
FIG. 7 is a cross-sectional view illustrating a roof rail unit of the vehicle body structure according to an embodiment of the present disclosure.

FIG. 5 illustrates a bracket 500 of the vehicle body structure according to an embodiment of the present disclosure, and FIG. 6 is a cross-sectional view illustrating the vehicle body structure according to the embodiment of the present disclosure. FIG. 7 is a cross-sectional view illustrating a roof rail unit 300 of the vehicle body structure according to an embodiment of the present disclosure.

The vehicle body structure according to the embodiment of the present disclosure may further include the bracket 500 formed at a cross point where the front pillar tube 220 and the center pillar tube 420 cross each other. More preferably, the bracket 500 may be formed on an upper surface of the front pillar tube 220 at a position where the front pillar tube 220 and the center pillar tube 420 cross each other. The bracket 500 may be configured to include a central portion 510 and a flange portion 520. More specifically, the bracket 500 may be composed of a central portion 510 and flange portions 520 extending on both sides.

The central portion 510 may be configured to contact the front pillar tube 220. The flange part 520 may be configured to contact the center pillar tube 420. The front pillar tube 220 may be welded and coupled to the inside of the central portion 510, and the center pillar tube 420 may be welded and coupled to the inside of the flange portion 520. The front pillar tube 220 and the center pillar tube 420 may be connected by the bracket 500 to compensate for crossing misfit between the front pillar tube and the center pillar tube at the cross point.

The roof rail unit 300 may be configured to include an upper roof rail 310 and a lower roof rail 320. The upper roof rail 310 may be configured to be in contact with the upper surface of the center pillar tube 420. The lower roof rail 320 may be in contact with the lower surface of the center pillar tube 420 and may be formed to extend from the lower end of the upper roof rail 310.

More preferably, the upper roof rail 310 and the lower roof rail 320 may be configured to surround at least a portion of the center pillar tube 420. The center pillar tube 420 may be at least partially welded to the inner surfaces of the upper roof rail 310 and the lower roof rail 320 to form a connection therebetween.

In the vehicle body structure according to the embodiment of the present disclosure, the windshield 100 may be configured to at least partially overlap at least a portion of the upper roof rail 310. More preferably, the upper roof rail 310 may extend in the width direction to overlap a portion of the windshield 100. Accordingly, the upper roof rail 310 may be formed in a structure that connects the windshield 100 and a roof panel of a vehicle.

In summary, the present disclosure provides the vehicle body structure capable of securing rigidity while expanding a space/field of view by removing the front roof rail from the vehicle structure and designing the front pillar 210 and the center pillar 410 to cross each other.

The above detailed description is illustrative of the present disclosure. In addition, the above description shows and describes preferred embodiments of the present disclosure, and the present disclosure can be used in various other combinations, modifications, and environments. That is, changes or modifications are possible within the conceptual scope of the invention disclosed herein, the scope equivalent to the described disclosure, and/or the technical scope or knowledge in the art. The disclosed embodiments illustrate the best mode for implementing the technical idea of the present invention, and various changes required in specific application fields and uses of the present invention are possible. Therefore, the detailed description of the present invention is not intended to limit the present invention to the disclosed embodiments. Also, the appended claims should be construed as including other embodiments.

What is claimed is:

1. A vehicle body structure comprising:
   a front pillar tube positioned inside of each of a pair of front pillars in a vehicle;
   a center pillar tube positioned inside of each of a pair of center pillars of the vehicle,
   wherein the front pillar tube and the center pillar tube cross each other; and
   a bracket located at a crossing position of the front pillar tube and the center pillar tube.

2. The vehicle body structure according to claim 1, further comprising a roof rail unit extending on a roof on both ends of the front pillars.

3. The vehicle body structure according to claim 2, wherein the front pillar tube is welded to an inner surface of the front pillar on one side, and the center pillar tube is welded to an inner surface of the center pillar on one side.

4. The vehicle body structure according to claim 2, wherein the front pillar tube is longer than a longitudinal length of a vehicle windshield.

5. The vehicle body structure according to claim 2, wherein the center pillar tube extends to the roof rail unit.

6. The vehicle body structure according to claim 1, wherein the bracket comprises
   a central portion in contact with the front pillar tube, and
   a flange portion in contact with the center pillar tube.

7. The vehicle body structure according to claim 6, wherein the front pillar tube is welded and coupled to an inner side of the central portion, and the center pillar tube is welded and coupled to an inner side of the flange portion.

8. A vehicle comprising:
   a vehicle body structure comprising:
      a front pillar tube positioned inside of each of a pair of front pillars in the vehicle;
      a center pillar tube positioned inside of each of a pair of center pillars of the vehicle,
      wherein the front pillar tube and the center pillar tube cross each other; and
      a roof rail unit extending on a roof from both ends of the front pillars,
      wherein the roof rail unit comprises:
         an upper roof rail in contact with an upper surface of the center pillar tube, and a lower roof rail in contact with a lower surface of the center pillar tube and disposed under the upper roof rail; and at least a portion of a windshield of the vehicle overlapping at least a portion of the upper roof rail.

9. The vehicle body structure according to claim 2, wherein the center pillar and the roof rail unit are aligned with each other in a vehicle width direction.

10. The vehicle body structure according to claim 1, wherein a cross section of the front pillar tube and a cross section of the center pillar tube have a trapezoidal shape in which respective sides adjacent to an exterior side of the vehicle are shorter than respective sides adjacent to an interior side of the vehicle.

11. The vehicle body structure according to claim 1, wherein the center pillar tube extends beyond a position of a door striker in a lower portion of the vehicle.

12. The vehicle according to claim 8, wherein the center pillar and the roof rail unit are aligned with each other in a vehicle width direction.

13. The vehicle according to claim 12, wherein the center pillar tube extends to the roof rail unit.

14. The vehicle according to claim 8, wherein the front pillar tube is longer than a longitudinal length of the windshield.

15. The vehicle according to claim 8, further comprising a roof panel, wherein the upper roof rail connects the windshield and the roof panel.

16. The vehicle according to claim 8, further comprising a bracket located at a crossing position of the front pillar tube and the center pillar tube, wherein the front pillar, the roof rail unit, and the center pillar are connected at a mutual cross point that forms a corner of the windshield.

17. The vehicle according to claim 16, wherein the windshield extends continuously from the front pillar to the roof rail unit without a front roof rail structure interrupting the windshield.

* * * * *